United States Patent
Luce et al.

(10) Patent No.: US 7,356,558 B2
(45) Date of Patent: Apr. 8, 2008

(54) SYSTEMS AND METHODS FOR MANUFACTURING

(75) Inventors: Anthony D. Luce, Winston-Salem, NC (US); Randy Wilson, Winston-Salem, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 834 days.

(21) Appl. No.: 10/224,877

(22) Filed: Aug. 21, 2002

(65) Prior Publication Data

US 2003/0125972 A1 Jul. 3, 2003

Related U.S. Application Data

(60) Provisional application No. 60/313,879, filed on Aug. 21, 2001, provisional application No. 60/389,209, filed on Jun. 14, 2002.

(51) Int. Cl.
*G06F 15/16* (2006.01)
(52) U.S. Cl. .................. 709/201; 705/1; 705/7
(58) Field of Classification Search ............ 705/1, 705/26, 29, 8, 14, 7, 28; 709/203, 223; 700/115; 707/103; 340/426
See application file for complete search history.

(56) References Cited

U.S. PATENT DOCUMENTS

| 5,625,816 | A | * | 4/1997 | Burdick et al. | ......... 707/103 R |
| 5,737,539 | A | | 4/1998 | Edelson et al. | |
| 5,796,952 | A | | 8/1998 | Davis et al. | |
| 5,845,255 | A | | 12/1998 | Mayaud | |
| 6,154,738 | A | | 11/2000 | Call | |
| 6,167,378 | A | | 12/2000 | Webber, Jr. | |
| 6,526,335 | B1 | * | 2/2003 | Treyz et al. | .................. 701/1 |
| 6,542,077 | B2 | * | 4/2003 | Joao | ...................... 340/426.16 |
| 6,574,661 | B1 | * | 6/2003 | Delano et al. | .............. 709/223 |
| 6,587,827 | B1 | * | 7/2003 | Hennig et al. | ................. 705/1 |
| 6,868,444 | B1 | * | 3/2005 | Kim et al. | .................. 709/223 |
| 6,952,688 | B1 | * | 10/2005 | Goldman et al. | ............. 706/45 |
| 6,980,963 | B1 | * | 12/2005 | Hanzek | ........................ 705/26 |
| 6,985,786 | B2 | * | 1/2006 | Wright | ........................ 700/115 |
| 7,054,836 | B2 | * | 5/2006 | Christensen et al. | .......... 705/26 |
| 7,054,901 | B2 | * | 5/2006 | Shafer | ......................... 709/203 |
| 7,072,934 | B2 | * | 7/2006 | Helgeson et al. | ........... 709/203 |
| 2002/0042755 | A1 | * | 4/2002 | Kumar et al. | ................. 705/26 |
| 2002/0072986 | A1 | * | 6/2002 | Aram | .......................... 705/26 |
| 2002/0072988 | A1 | * | 6/2002 | Aram | .......................... 705/26 |
| 2002/0087440 | A1 | * | 7/2002 | Blair et al. | ................... 705/29 |

(Continued)

OTHER PUBLICATIONS

International reuse program in a green field Fab Grinshpan, A.; Lavi G.; Semiconductor Manufacturing, 2000. Proceedings of ISSM 2000. The Ninth International Symposium on Sep. 26-28, 2000 pp. 221-224.*

(Continued)

*Primary Examiner*—Thong Vu
(74) *Attorney, Agent, or Firm*—Kilpatrick Stockton LLP

(57) ABSTRACT

Systems and method for the manufacture of goods, including apparel, piece goods, and other assembled items are described. Embodiments of this invention provide systems for managing the flow of component parts to an assembly site, the assembly of finished goods, and the flow of finished goods from the assembly site to distribution sites. Embodiments of this invention are particularly advantageous for use in the apparel industry, for example, in the manufacture of garments such as t-shirts.

17 Claims, 6 Drawing Sheets

U.S. PATENT DOCUMENTS

| | | | |
|---|---|---|---|
| 2002/0138321 A1* | 9/2002 | Yuan et al. | 705/8 |
| 2002/0178077 A1* | 11/2002 | Katz et al. | 705/26 |
| 2002/0188486 A1* | 12/2002 | Gil et al. | 705/7 |
| 2003/0018490 A1* | 1/2003 | Magers et al. | 705/1 |
| 2003/0033179 A1* | 2/2003 | Katz et al. | 705/7 |
| 2003/0110104 A1* | 6/2003 | King et al. | 705/28 |
| 2003/0125972 A1* | 7/2003 | Luce et al. | 705/1 |
| 2003/0208397 A1* | 11/2003 | VanDusen | 705/14 |
| 2005/0187834 A1* | 8/2005 | Painter et al. | 705/28 |

OTHER PUBLICATIONS

An infrastructure for the dissemination of information on KGD Roughton, M.G.; Radley, D.; Amirtham, A.S.; Truzzi, C.; Multichip Modules, 1997., 6th International Conference on Apr. 2-4, 1997 pp. 265-271.*

PCT Written Opinion Corresponding to PCT/US02/26588, mailed May 23, 2003.

PCT/US02/26588 International Search Report, mailed Feb. 28, 2003.

* cited by examiner

SYSTEMS AND METHODS FOR MANUFACTURING

CROSS-REFERENCE TO RELATED APPLICATIONS

This patent application claims priority to provisional patent application, No. 60/313,879, filed on Aug. 21, 2001 by Anthony D. Luce, et al., entitled "Systems and Methods for Manufacturing," the disclosure of which is incorporated herein by reference. This patent application also claims priority to provisional patent application, No. 60/389,209, filed on Jun. 14, 2002 by Anthony D. Luce, et al., entitled "Systems and Methods for Manufacturing," the disclosure of which is incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

This invention relates to methods and systems for the manufacture of goods, including apparel, piece goods, and other assembled items. In particular embodiments, this invention provides systems for managing the flow of component parts to an assembly site, the assembly of finished goods, and the flow of finished goods from the assembly site to distribution sites. Embodiments of this invention are particularly advantageous for use in the apparel industry, for example, in the manufacture of garments such as t-shirts.

BACKGROUND OF THE INVENTION

In the manufacture of finished goods that include multiple component parts, it is fairly common for the component parts to be manufactured at a location different from the location where the finished goods are assembled. For example, in the manufacture of t-shirts or other knitwear items, the component parts, for example, collar, left sleeve, right sleeve, front, and back of a shirt may be produced at a textile plant and then shipped to an assembly site for sewing into a finished shirt. This process may include the assembly of shipping containers, including the component parts, the shipment of those containers to an assembly site, the opening of the containers at the assembly site, the assembly of finished goods using the components included in the containers, the packaging of finished goods in containers, and the shipment of finished goods containers to distribution or retail sites.

During the manufacturing/assembly operation itself, it is often desirable to track the number of finished products being manufactured by particular teams, stations, assembly lines, or the like. It is also advantageous to have records relating to the assembly process. As are appreciated by those who are skilled in the art from the foregoing description, providing managers with access to detailed information at every stage of the process facilitates management of the assembly process. It would also be advantageous to automate portions of the overall finished good production process and, in particular, the tracking, preparation, and shipment of containers from component manufacturing sites to assembly sites to distribution sites, and the assembly of finished goods.

Conventionally, manufacturers use enterprise resource planning systems (ERP), such as SAP, to monitor and control manufacturing and related processes. However, the cost of purchasing and implementing these ERP systems is extremely high. Also, conventional ERP systems are adept at integrating processes within an organization, but it can be difficult to implement a system across multiple organizations.

Furthermore, conventional manufacturers often utilize outsourcing for some of all of the manufacturing processes. In an outsourcing environment, companies contract with various manufacturers across the globe. The benefits of this strategy are apparent, the owner of the contract manufacturing company focuses on a core competency and is thus better able to control costs. Also, the contract manufacture is often located in areas of the world in which labor costs are much lower than in the home country of the primary manufacturer. Furthermore, by contracting manufacturing out, the large manufacturer avoids the capital expenditure and ongoing expenses necessary to build and maintain a manufacturing facility.

Therefore, manufacturers require a means of monitoring and controlling manufacturing processes occurring both in facilities the manufacturer owns and runs and in facilities owned by contract manufacturers. Implementing an ERP system in such an environment is prohibitively expensive and would require a substantial outlay of time and money each time the manufacturer begins or ends a relationship with the contract manufacturer.

Also, a manufacturer may wish to limit the information provided to a contract manufacturer. For example, in the case of a contract manufacturer that works for a manufacturer and for the manufacturer's direct competitor, the primary manufacturer may wish to limit the contract manufacturer's knowledge regarding total planned production for a particular product.

This invention provides these and other advantages.

SUMMARY OF THE INVENTION

Embodiments of this invention provide systems and methods for monitoring and controlling an integrated manufacturing process, such as an apparel manufacturing process. In one embodiment, a browser-based system allows secured access by authorized personnel to the integrated manufacturing system and its data from anywhere in the world. The system allows fully centralized to fully decentralized operation, depending on the reliability of wide area network (WAN), Internet, or other communications between the various manufacturing facilities.

One embodiment of this invention includes a web application server and a manufacturing application installed on the server. The server is in communication with a private, public or governmental computer network, such as a wide area network, the Internet, a dial-up network, or some of other type of network. Also in communication with the network are independent supplier facilities that act as contract manufacturing sites for a primary supplier and other facilities, which are owned by the primary manufacturer. Embodiments of the present invention are particularly advantageous when the primary manufacturer is an apparel manufacturer.

An embodiment of this invention is constructed from modules or discreet computer software components. The software module includes at least one of: an order receiving module, an inventory tracking module, a product shipping module, a quality audit tracking module, a personnel tracking module, a production tracking module, a payroll interface module, an attribution tracking module, a supplies tracking module, an in-plant production scheduling module, and a multi-lingual module.

In an embodiment of this invention, a manufacturing facility includes a client processor. For example, a manufacturing facility may include a data collection server and a data collection device in communication with the data collection server. The data collection device allows the facility to track products, packaging, or other items in an automated fashion and may include, for example, a mobile or stationary bar code scanner. The data collection device may be wired or may be portable, communicating with the data collection server via a wireless network base station, such as a WI-FI (802.11b) radio frequency (RF) base station. The client processor may instead or also include a personal computer.

An embodiment of this invention provides a primary manufacturer with the ability to receive manufacturing-related data, including inventory and other data, from independent suppliers and self-owned facilities, combine this data to create an integrated manufacturing data store, and then use the data store to monitor and control the entire manufacturing process.

The data included in the data store may include any attributes related to manufacturing. For example, in one embodiment, the data includes: an order receiving data element, an inventory tracking data element, a product shipping data element, a quality audit tracking data element, a personnel tracking data element, a production tracking data element, a payroll interface data element, an attribution tracking data element, a supplies tracking data element, and an in-plant production scheduling data element.

This invention provides robust manufacturing execution systems that may be varied to meet differing needs in the manufacture of particular finished goods. In an embodiment, this invention provides an enterprise level computer system to meet the receiving, inventory tracking, shipping, personnel tracking, quality auditing, production tracking, supplies tracking, payroll generation, and/or other needs of the manufacturing industry. Embodiments of this invention may operate in decentralized fashion with data being centralized when the reliability of communications reaches a satisfactory level.

Embodiments of this invention may be implemented as a site on a computer network such as the World Wide Web; a corporate intranet; a government/military network or the like. Preferably, for ease of access to the widest number of participants, embodiments of this invention are implemented as a site on the World Wide Web (internet), or corporate intranet or extranet, with appropriate security safeguards. Currently available hardware platforms, including PC's, Minicomputers and mainframes, and currently available operating systems, including UNIX, MS Windows, Mac OS and Linux, may be utilized in embodiments of this invention as client, server, and middleware platforms.

An embodiment of this invention provides a fully functional and fully integrated manufacturing execution system to meet a manufacturer's information needs from a self-owned, contractor, and sourcing manufacturing plants. The system's data will allow corporate management and plant management to perform better plant administration, contractor administration, production planning, inventory tracking, quality control, and Customs regulation adherence while maintaining the lowest cost production as possible.

Further details and advantages of this invention are set forth below.

BRIEF DESCRIPTION OF THE DRAWINGS

These and other features, aspects, and advantages of this invention are better understood when the following Detailed Description is read with reference to the accompanying drawings, wherein.

DETAILED DESCRIPTION OF THE INVENTION

Embodiments of this invention provide systems and methods for monitoring and controlling an integrated manufacturing process, such as an apparel manufacturing process. In one embodiment, a web-enabled system allows secured access by authorized personnel to the integrated manufacturing system and its data from anywhere in the world. The system allows fully centralized to fully decentralized operation, depending on the reliability of wide area network (WAN), Internet, or other communications between the various manufacturing facilities.

Figure 1:
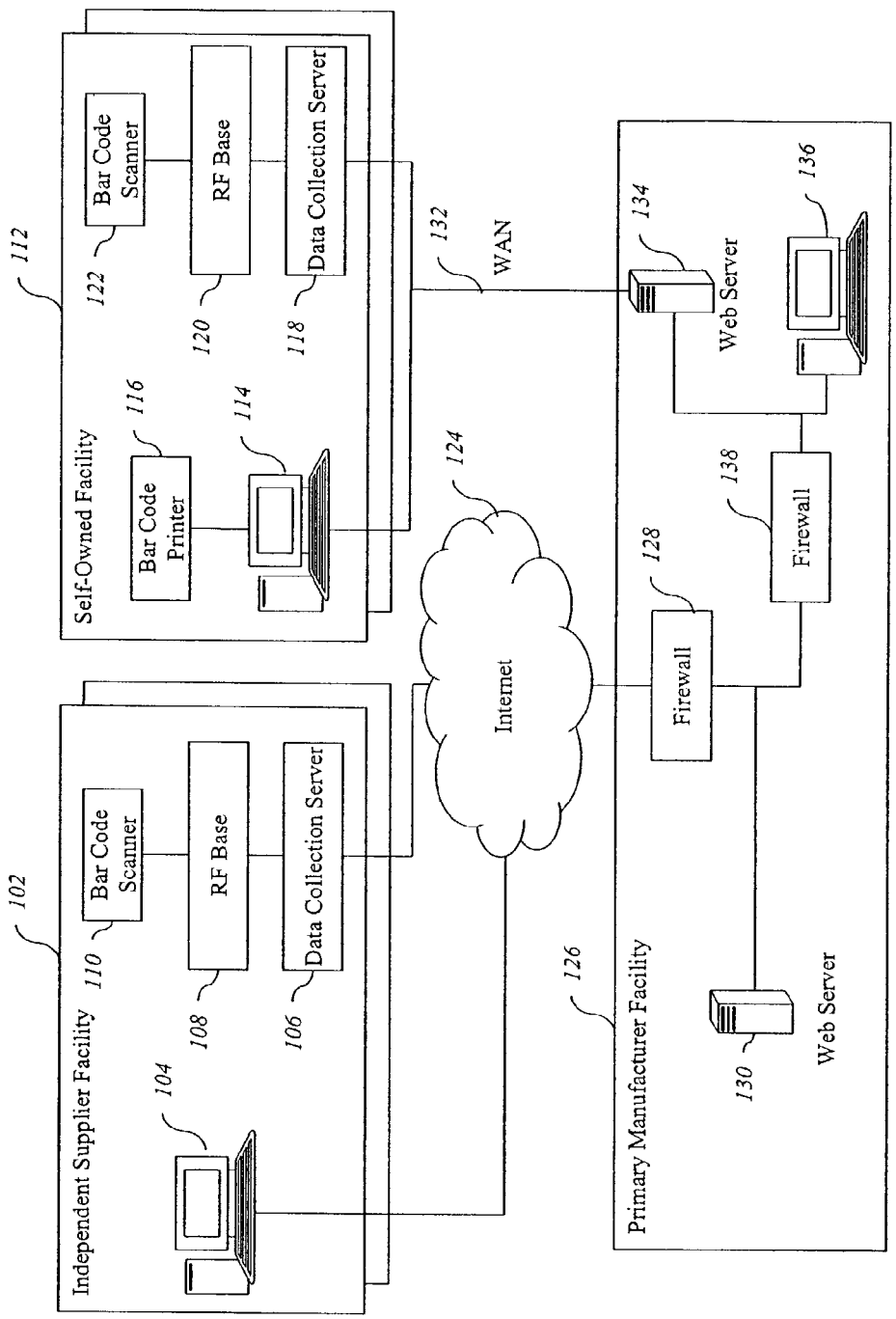
FIG. 1 is a block diagram illustrating an exemplary environment for operation of an embodiment of this invention.

Referring now to the Figures in which like numerals indicate like elements throughout the several Figures, FIG. 1 is a diagram illustrating an exemplary environment for operation of an embodiment of this invention. The embodiment shown includes a plurality of independent supplier facilities, represented by an independent supplier facility 102. The independent supplier performs tasks for a manufacturer, such as assembling a subcomponent of a finished product or assembling the finished product itself. The independent supplier facility includes a client processor, personal computer 104. The facility 102 also includes a data collection server 106 for collecting information related to manufacturing within the facility 102. The facility also includes a radio-frequency (RF) base station 108 in communication with the data collection server 106. The RF base station 108 provides a means for data collection devices, such as bar code scanner 110, to transmit data to the data collection server 106. The scanner 110 and RF base station 108 communicate via a common wireless standard, such as 802.11b or BlueTooth.

The embodiment shown in Figure also includes a plurality of self-owned facilities, represented by self-owned facility 112. Like an independent supplier, a self-owned facility performs at least a portion of the tasks necessary to complete the manufacture of a product. However, unlike the independent supplier, the self-owned facility 112 is owned by the manufacturer and therefore may be monitored and managed somewhat differently from the independent supplier. For example, confidential information may be shared with computer systems of a self-owned facility 112 but not with those of an independent facility 102. Self-owned facility 112 also includes a client processor, PC 114. PC 114 may be any computer capable of executing browser software. For example, PC 114 may include an Intel-based processor, utilize a Microsoft Windows family operating system, and utilize Microsoft Internet Explorer for accessing the integrated manufacturing application. Alternatively, PC 114 may utilize a Mac or Linux operating system and a Netscape Navigator or Opera browser to access the application.

FIG. 1 illustrates various components that may be present in a manufacturing facility. However, the components shown in FIG. 1 are merely exemplary of the components that may be present and utilized in an embodiment of this invention. For example, self-owned facility 112 includes a bar code printer 116. It is likely that self-owned facility 112 and independent supplier facility 102 may include additional components, such as manufacturing control computers, laser printers for printing documents and reports, label printers, and assorted other components. An embodiment of this invention may make use of many of these additional components when they are present. In the embodiment shown, self-owned facility 112 also includes a data collection server 118, RF base station 120, and a bar-code scanner 122.

Since the independent supplier facility 102 and the self-owned facility 112 are not both owned and controlled by primary manufacturer, the method of communicating for each may be subject to different levels of security. For example, in the embodiment shown in FIG. 1, the various elements present in independent supplier facility 102 utilize the Internet 124 to communicate with the primary manufacturer facility 126. Communications arriving from the Internet 124 pass through a firewall 128 into a demilitarized zone (DMZ), a term of art referring to an internal computer network that is isolated from the Internet by a firewall and also isolated from the primary internal computer network by a second firewall. Primary manufacturer facility 126 also includes a web server 120. The primary manufacturer's integrated manufacturing application executes on the web server 130. Web server 130 includes various software components for executing the integrated manufacturing application. For example, in one embodiment, web server 130 includes Microsoft Internet Information Sever for receiving and responding to hypertext transfer protocol (HTTP) requests, file transfer protocol (FTP) requests, and for executing application code, such as the code contained in Microsoft Active Server Pages (ASP) web pages. Web server 130 may also include database software, such as the Microsoft SQL Server relational database management system (DBMS). Web server 130 may also include software for implementing remote procedure calls, transactional capabilities, and/or resource pooling. For example, in one embodiment a COM+ (common object model plus) architecture is utilized. In another embodiment, a common object request broker architecture (CORBA) is utilized.

Web server 130 may also include software to perform transportation and transformation of extensible markup language (XML) and other documents. For example, in one embodiment of this invention, web server 130 includes Microsoft BizTalk Server. BizTalk Server is a suite of software that provides the ability to take a document on a computer or in a computer network, which is structured in a certain format, and transform and transport the document to another location and to create another the document in a different format. This ability allows for documents to be mapped and transformed so that they can be tailored to an individual location's data structure requirement.

Web server 130 may also include more than one physical device. For example, in one embodiment, web server 130 is a cluster of computers providing both redundancy and load balancing for handling requests and executing applications. Communication between these various platforms may utilize proprietary or standard communications protocols and methods. For example, in one embodiment, communication between various software components and the database takes place via XML. In another embodiment, the various components are web services and communication occurs via web services communication protocols.

The manner in which the various components of the integrated manufacturing system function and interact may vary in embodiments of this invention. For example, in one embodiment, the manufacturing system includes 5 tiers. A tier is a logical layer in an application execution environment. The tiers include an interaction tier, a presentation tier, a business logic tier, a data transfer tier, and a data store tier. An interaction tier includes the physical means by which a user interacts with the overall application (operating system, personal computer, or device). A presentation tier includes the means by which the application is presented to the user (software application for display, behavioral code, and languages to support styling and aestheticism). A business logic tier includes the accrued rules of information interaction are enforced (e.g. a phone number is stored in the form XXX.XXX.XXXX, or that a shipping clerk is not able to ship an open Bill of Lading). A data transfer tier specifies how information is to move throughout the enterprise, and defines its entitlements. And in the data store tier, all real data is seamlessly presented to a physical device (hard drive, tape backup, etc.) in an ordered, industry-defined standard means.

In contrast to the independent supplier, self-owned facility 112 communicates with the primary manufacturer via a wide area network (WAN) link 132. The WAN link 132 provides high bandwidth over a secure communication line. Both data collection server 118 and PC 114 communication with a web server 134 via the WAN link 132. Web server 134 also executes the integrated manufacturing application and may serve as a mirror server to web server 130. Any necessary data is duplicated on the two web servers as necessary to maintain consistency. The primary manufacturer facility 126 also includes a client processor, PC 126. Both the PC 136 and the web server 134 in the internal network are in communication with a second firewall 138, and through the second firewall 138 with the web server 130.

FIG. 1 illustrates just one exemplary environment for operation of an embodiment of this invention. In the environment shown in FIG. 1, the client processor 104, 114 are "thin clients." They execute only a browser, and the web server 130 performs the computer-intensive tasks. In another embodiment, the self-owned facility 112 also includes a web server. The web server exchanges data with web server 134 so that if the WAN link 132 is unavailable, the self-owned facility can continue to function using the local web server. In yet another embodiment, an independent supplier facility 102 includes only a PC 104 that has access to the Internet 124. All manufacturing-related processing takes place via the single PC 104. Such an embodiment is particularly advantageous in areas lacking sufficient technological infrastructure to support an embodiment utilizing broadband services exclusively.

Providing the capability to connect to the primary supplier facility 126 in using various methods are particularly advantageous in embodiments in which a subset of the independent of self-owned facilities are located in areas lacking state of the art communications infrastructure, such as a developing country, and another subset of the facilities are located in countries supporting a state of the art communications infrastructure. By providing a variety of means of communicating, each of these facilities is capable of communicating at the best possible speed. In addition, should a problem arise in communicating via a particular communications channel, another communications channel may be used interchangeably without causing the system according to this invention to cease functioning. In addition, the various methods of communication may be used simultaneously if necessary or desired.

Embodiments of this invention provide components to perform numerous manufacturing-related processes. For example, in one embodiment, a user or automated process can perform: cut parts and/or work order receiving, inventory tracking, cut parts and/or product shipping, and quality audit tracking. In another embodiment, a user or automated process can perform cut parts and/or work order receiving, inventory tracking, including lot and SKU-based inventory tracking, cut parts and/or product shipping, shipping functions, quality audit tracking, personnel tracking (including time and attendance), production tracking, source to gross payroll, attribution tracking, supplies tracking, and in-plant production scheduling. The combinations of these functions in an embodiment of this invention help to improve production planning and response time to inventory losses. In addition, these features are specifically designed to facilitate Customs processing of goods manufactured according to this invention. For example, the components of the system are designed to automatically produce all shipping and Customs paperwork.

An embodiment of this invention may include the capability to interface with existing legacy systems. One embodiment includes one or more of the following legacy system interfaces and support programs: First Quality Style Load, Off Quality Style Load, First Quality Nightly Verification, Off Quality Nightly Verification, Transmit PICS Manifest, Transmit MCS Manifest, Size Matrix Load, Carrier Code Load, Conversion Style Load, and Destination Load. In such an embodiment, the interfaces and support programs are defined as follows: First Quality Style Load takes First Quality Styles from the legacy system as input, verifies the styles against the Mainframe and populates the database with these styles. This information is used to print first quality full case labels and odds consolidation case labels.

The Off Quality Style Load takes Off Quality Styles from the legacy system as input, verifies the styles against the Mainframe, and populates the database with these styles. This information is used to print off quality full case labels and odds consolidation case labels. The First Quality Nightly Verification creates a file with all First Quality Styles in the database and executes the verify job on the Mainframe. It then processes this verification by updating the database Style Tables. This information ensures the first quality style information remains up-to-date. The Off Quality Nightly Verification creates a file with all Off Quality Styles in the database and executes the verify job on the Mainframe. It then processes this verification by updating the database Style Tables. This information ensures the off quality style information remains up-to-date. The Transmit PICS Manifest creates a file with all the information on a Shipping Manifest in a format needed by PICS and sends this file to the Mainframe. It then executes the Mainframe Job to process this manifest. This information is used to give the plant production credit and feed the Cost System. The Transmit MCS Manifest creates a file with all the information on a Shipping Manifest in a format needed by MCS and sends this file to the Mainframe. It then executes the Mainframe Job to process this manifest. This information is used as an Advanced Shipment Notice (ASN) to allow the automated receipt of the cases by the conveyor belt system at the distribution center.

The Size Matrix Load takes a Size Matrix Download file from the Mainframe and loads the information into the database. This information is used in the case label generation process. The Carrier Code Load retrieves the Carrier Code file from the Mainframe and loads it into the database. This information is used to ensure that only valid carrier codes are used in the shipping process—thus avoiding Customs issues. The Conversion Style Load retrieves the Garment Master extraction from the Mainframe and updates the Style Data in the database with the Conversion Style records. This information is used to properly print case labels for styles entering the plant as manufacturing styles and leaving as selling styles. And the Destination Load retrieves the Destination file from the Mainframe and loads the Plant and Destination information into the database. This information is used to ensure that only valid destination codes are used in the shipping process—thus avoiding Customs issues.

Figure 2:
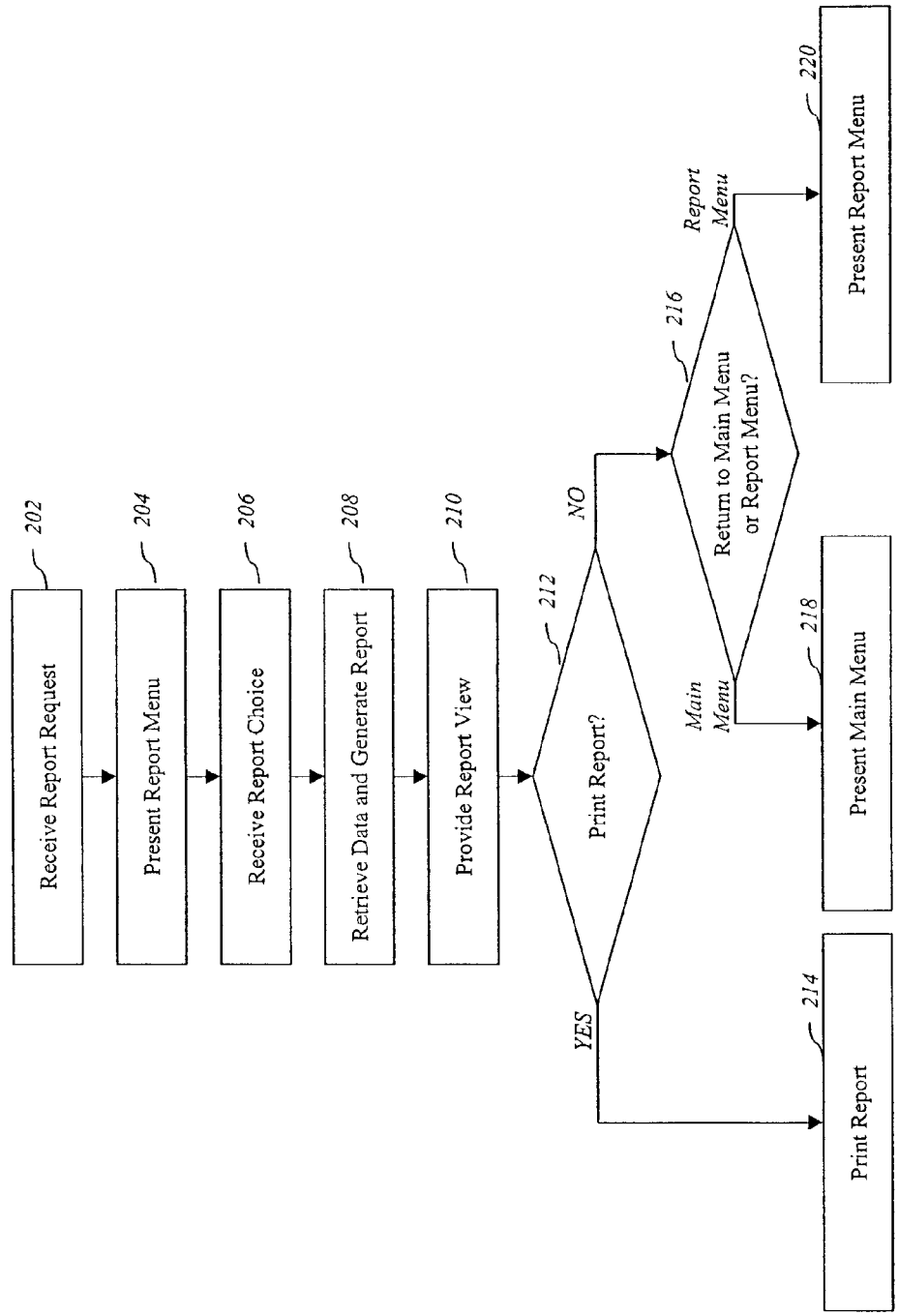
FIG. 2 is a flow chart illustrating a method of providing reporting in an embodiment of this invention.

In order to effectively monitor and control a distributed manufacturing process, an embodiment of this invention includes the capability of creating a variety of reports. FIG. 2 is a flow chart illustrating a reporting process in an embodiment of this invention. The system first receives a report request 202. For example, in one embodiment, from the main site navigation menu the user selects a report. In such an embodiment, there are two ways to access a report: (1) from the actual reports menu, and (2) by navigating through the other menus to an activity and selecting the reports associated with that activity. This flexibility is supported through the security components of the system for managing the concept of "activities".

In response to the request, the system presents the Report Menu 204. In one embodiment, the Report Menu is a web page that includes hyperlinks to other web pages that include report data. The other web pages may be either dynamic or static. The user chooses the specific report to execute and view by selecting the link representing the report name. The system receives the report choice 206. In response, the system retrieves the appropriate data and generates the report 208. Next, the system presents a report-view page, which displays the data for the requested report 210. The system provides the user with the choice of printing the report 212. If the user chooses to print the report, the system prints the report 214. If not, the system presents the user with the option of either returning to the Main Menu or to the Report Menu 216. If the user chooses the main menu, the system presents the Main Menu 218. Otherwise, the system presents the Report Menu 220.

A system according to this invention may produce reports in any number of ways. For example, in one embodiment, a database contains tables that list report names, descriptions, sort order, and version of the reports, as well as the users who may run the reports. When a user wishes to view a report, they navigate to an interface that provides a menu of the reports that they have access to. They then choose a report to view from this menu. This interface requests that the report be run from a component running on the application server. This component in turn requests data for the report from a database by calling a stored procedure, and returns the results. That component formats the results and passes them back to the user in a report-viewing interface.

Many different types of reports may be useful to users of a system according to this invention. One embodiment of this invention includes at least the following reports: a Shipping Manifest Details Report, a Shipping Manifest Summary report, a Bill of Lading report, a Style Master report, and a Location report. The Shipping Manifest Details Report provides a list of detail information about what is included in a manifest. The report includes Case#, Style, Color, Size, and Quantity. The Shipping Manifest Summary report provides a list of summary information about what is included in one or several manifests. The report includes: Style, Quantity, Price/Dz, and Extension.

The Bill of Lading report provides a summary listing of Bills of Lading (BOL). The report allows a user to view the history of BOLs and drill down to see a specific BOL. The actual process of printing the BOL is contained within the Bill of Lading/Shipping Manifest components. The Style Master report allows for querying the Style Master. It is used to ensure that styles at corporate match styles at plants. This report includes various sections, including a section for Style, Colors, and sizes. The user can limit results of a section by choosing options from other sections. For example, a user can view the active styles for their division/plant combination, choose a style, and view colors or sizes for that style. Likewise, the user may view colors first then view the styles and or sizes that are of that color. The report includes Case Style, Color, Size Code, Size Line, Size Position, Dz/Case, Off Quality Columns, Revision Code, Gross Weight, Net Weight, Color Code, and Color Description. The location reports allow viewing of data concerning different facilities, locations, and destinations and include Plant Code, Company Name, and To Addresses. As is clear to one skilled in the art, these reports are described merely as examples of particularly useful reports. An embodiment of this invention may include many additional and/or different reports.

In one embodiment of this invention, a reporting engine handles requests to create reports. The reporting engine consists of a COM+ component residing on the web and/or application server. The component receives a request for a certain report and requests the data for that report from the corporate database. Once the data is received, the component will match the report request with information pointing to eXtensible Stylesheet Language for Transformations (XSLT) documents. The data is processed and transformed into HTML by the XSLT processor using the XSLT documents. The resulting HTML is returned to the web server and served to the client. The aforementioned process allows for the addition of new reports simply by creating an XSLT document, and a stored procedure for returning data.

One embodiment of this invention includes a generic and modifiable means to display multiple, selectable languages in user interface. In one such embodiment, in an effort to make the development of a multilingual system user customizable, all multilingual information is stored in the relational database system accessible by web server 130. This approach allows for a single point of storage for translated labels and provides a mechanism, using stored procedures, which allows the addition of future languages as well as the ability to customize current translations within the application. The database includes five tables; a labels table, a translations table, a label languages table, a pages table, and a pages labels cross-reference table. The system displays the interface in a particular language based on user preferences, geographical location, or another indicator.

The Labels table provides a developer friendly name for using the multilingual information stored within the database. The Labels table provides a Label Name attribute that is placed into the development portions of the application requiring multilingual support. Throughout the application, the Label Name is used to indicate that visible text is obtained from the database based on the current language for the user.

The Translations table contains all translated text that is displayed to the user. The Translated Data attribute contains the text that is presented to the user whenever a Label that links to the translated data is used in the system. The table contains translated text that is used in any error messages, labels, buttons, and navigational areas in the system. The Translations table will not contain any translations for user or system-entered data in the system.

The Label Languages table maintains a link between a Label, a Language, and a Translation. A Label in the system has an entry in this table for each language that the system supports. If an entry is omitted from this table for a specific Label or Language, then the system displays a generic message indicating that the translation for the label is not available.

The database in such an embodiment also maintains a Pages and a Page Labels Cross-Reference table. The Pages table maintains a record for every web page or other web item that can contain multilingual labels. The purpose of the Pages table is to associate labels with the pages that use them in the system for maintainability as well as to reduce the data retrieval time per page to only the labels that is used on the page. The Page Labels Cross-Reference table maintains a link between a Page record and a Label record and indicates which Labels are available for use on a page.

Embodiments of this invention include interfaces to legacy systems for a variety of purposes. For example, in one embodiment, production routings are the method used to communicate attribution routing directions to plants, feed manufacturing results back to the planning systems and set inventory valuation points in an inventory valuation system. Therefore, in order to interface to legacy or other inventory valuation system, an embodiment of this invention uses production routings in its processes. In such an embodiment, these production routings are stored in a product master system called the Product Information Manager (PIM).

Figure 3:
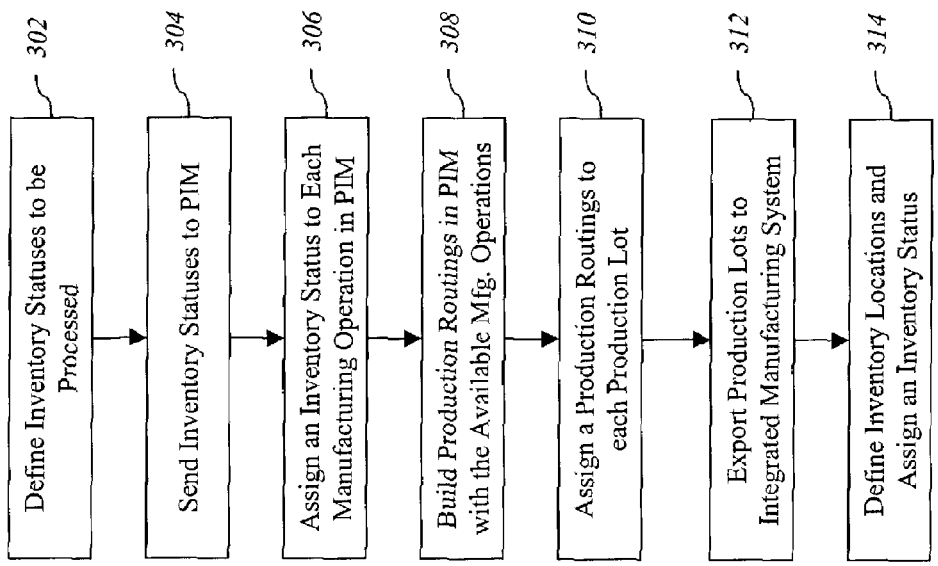
FIG. 3 is a flow chart, illustrating a method according to this invention for interfacing with a legacy production information management application in an embodiment of this invention.

FIG. 3 is a flow chart, illustrating a method according to this invention for implementing an interface to a legacy PIM application. First, the developers of the integrated manufacturing system define inventory statuses to be processed 302. The statuses vary based on the product to be manufactured. The developers send or import these statuses to the PIM 304. In an embodiment of this invention in the garment industry, the available status values may include the following: In Transit, On Site, Received, Suspended, Issued, Issued to Sewing, Issued to embroidery, Issued to Screen Printing, Issued to Garment Washing, Issued to Value Add, Sewn, Embroidered, Screen Printed, Garment Washed, Value Added, Produced, Produced and Packed, Manifested, Shipped, and Disposed.

Once the statuses are defined and exported, the department in charge of inventory and/or finance then assigns an inventory status to each manufacturing operation in the PIM 306. Production routings are then built using the available manufacturing operations 308. The department in charge of production planning then assigns production routings to each production lot 310. These lots are then exported to the integrated manufacturing system 312. Inventory locations (inventory tracking points) are then created for each manufacturing plant and assigned a status 314. Once the implementation is complete, then the integrated manufacturing system monitors inventory movement between Inventory Locations in each manufacturing plant and sends Production Routing transactions to the PIM based on the Inventory Statuses in the Production Routing One embodiment of this invention includes an inventory management component. The description of the inventory management component below includes references to several terms, which are defined as follows.

Inventory Status

Throughout the inventory management component, inventory status serves to identify locations and to enforce proper inventory movements. Inventory status also identifies the current location and makeup of inventory for garments within a plant. An inventory status is a code with a corresponding name and description that provides an informative identifier to a location. Every location that consumes or produces inventory in the system has a related status assigned to it. Every location is assigned a single status in the system to identify the type of inventory being stored in the location.

Inventory Location

An inventory location is a defined location in a plant or other facility that is assigned a name and a status so that it can consume inventory from and supply inventory to other locations. A location in the system corresponds to a single physical location. However, multiple locations in the system may correspond to the same physical location because a location is limited to a single status in the system and some locations, such as shipping docks, have multiple uses such as shipping finished goods, shipping partially finished cuts, etc. In these cases, multiple locations in the system correspond to a single physical location in the plant.

Advanced Ship Notice

The Advanced Ship Notice (ASN) is the digital document that the system receives from the textile plant that provides information about the Lot to be produced. The ASN provides information on the lots that are contained, the number of moonrocks that makeup the lot and various other information such as quantity, priority, etc.

Lot

A lot in the inventory management component is a unit for containing multiple work orders against which the plant actually does work. In an embodiment of this invention in the apparel industry, a textile plant provides the initial Lot and identifying lot number. The Lot is not used directly in the inventory management component, but contains one or more work orders that the plants will use in moving inventory in the system. The Lot is maintained for reporting, quality control, and other issues.

Work Order

A work order is a subset up to the entire amount of a lot that the plant will use to manage inventory. Plants utilize work orders when moving inventory within and between plants. A work order allows a lot to exist in multiple locations within a plant and to allow lots to span plants while in production. Work orders are identified in the system as children of particular lots so that reporting on lots will still be available. A work order's identifying attributes include a work order number, which is created using the shipping plant code along with the Lot number and a sequence number to insure uniqueness within the system.

Manufacturing Path

A manufacturing path identifies a particular route and Bill of Materials to be used in the production of a particular SKU. If routing is to be used for a lot, then a manufacturing path is assigned to the Lot, which are also populated down to a Work Order, that will enforce inventory movements of the lot to follow the assigned route for the specified manufacturing path.

Route

A route is a sequence of steps that identifies the plants, operations, and departments that inventory will move through in its production. When routing is enforced, inventory movements will only be valid when they follow the steps listed in the routing assigned to the work order and lot through a manufacturing path.

Inventory Transactions

Transactions are the main component of the inventory management component and track all movements of inventory with the system. Every movement of inventory in the system generates a transaction. Every transaction provides a from location that identifies the location that the inventory is being move from as well as the to location that identifies the location where the inventory is moving to. The transaction also provides the quantity that was moved along with a transaction type code to identify the reason for the transaction. All transactions are validated against a list of valid movements by status that is determined by the business.

Transaction Types

Transaction types are codes and descriptions that identify the type of a particular transaction. Transactions can occur because of normal movements, issues, shipping, production, etc., and the transaction type provides a way to determine why an inventory transaction was generated.

Reason Codes

Reason codes are used in the system to provide reasons why inventory was suspended. A reason code provides a description as to why inventory is being suspended and provide a default time in weeks indicating how long before the problem is resolved. Whenever inventory is suspended, reason codes are assigned to the inventory so that the system can identify suspended inventory in an informative manner.

In an embodiment of this invention, the inventory management component is to track inventory in the system and allows for its forward progress through the system. Whenever inventory is moved, either because of a user's explicit movement, or because of another process such as issuance, suspending, etc., the system validates that the inventory movement is valid within the system and then performs all transactions in the system for valid movements.

Figure 4:
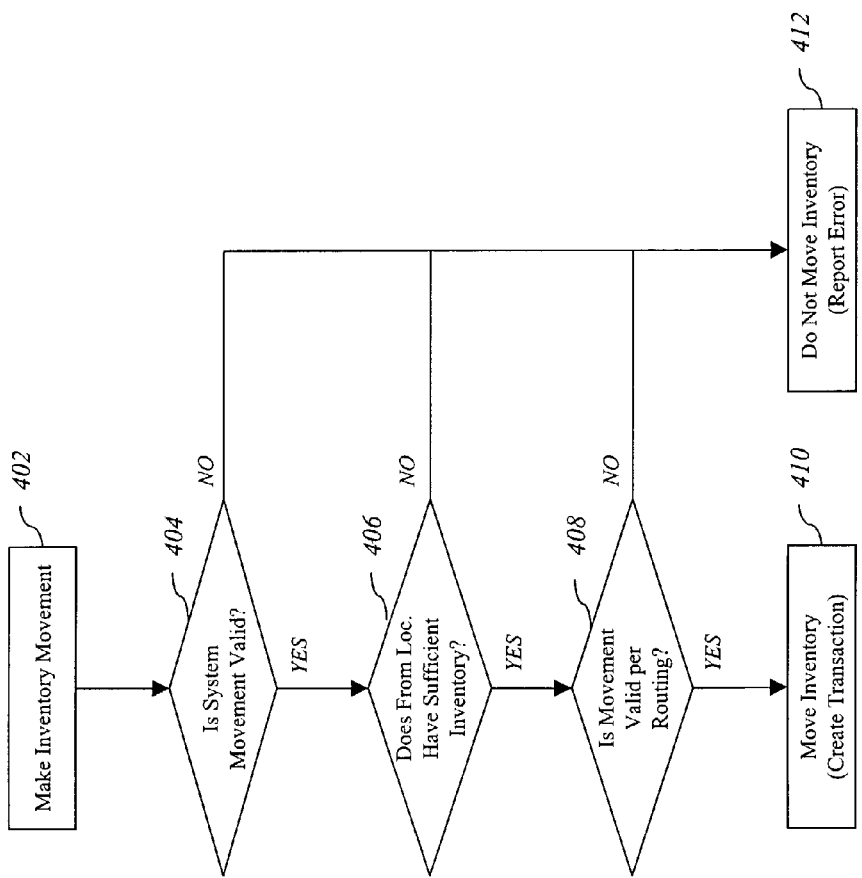
FIG. 4 is a flow chart illustrating a method for validating an inventory movement in an embodiment of this invention.

In the embodiment illustrated by FIG. 4, the first step in an inventory movement occurs when the user performs a move of inventory 402. The following information is utilized when moving inventory: From Location, To Location, Work Order, SKU, and Quantity.

The system's insures that the movement is valid within the system 404. A list of valid movements are stored in the system and used to validate whether a particular from/to location movement is valid. The table in the system contains a listing of valid movements much like the table below.

|   | From Location | To Location |
|---|---|---|
| 1 | In Transit | Receiving |
| 2 | Receiving | Issued |
| 3 | Issued | Receiving |

Referring to the table above, a valid inventory movement from "In Transit" to "Receiving" is present, so inventory can move from an "In Transit" location to a "Receiving" location. However, there is no corresponding entry in the above table for the opposite of that, so an inventory movement from "Receiving" to "In Transit" is disallowed by the system. The users of a system according to this invention define all of the valid inventory movements that are allowed by the system.

After checking that the inventory movement is valid within the system, the inventory movement validation process checks the quantity in the from location for the specified work order and SKU 406. If the quantity the user is trying to move is available in the current from location, then the movement is allowed. If the user is trying to move more inventory for the work order and SKU than is currently in the from location, then the system will disallow the inventory movement and the user makes an adjustment in the from location to create the additional quantity that is moved.

If the inventory movement is valid in the system and sufficient quantity is available for the move, then the system checks to see if the movement would break the routing provided for the work order 408. A call is made to the routing portion of the application providing the work order, the to location, the route, and the division that is producing the work order. The component validates that the inventory movement is valid either through the fact that the to location is the next step in the routing or that the movement is to a step that is not present in the routing, such as a suspended status location. The component will also check the division code to determine if routing is in use for a particular division. If routing is not enabled for a division, then any inventory movement that passes the previous two validation checks are allowed 410, i.e. routing information is essentially ignored. Any inventory movement that fails any of the above validation checks is not allowed, and an error is reported 412.

Figure 5:
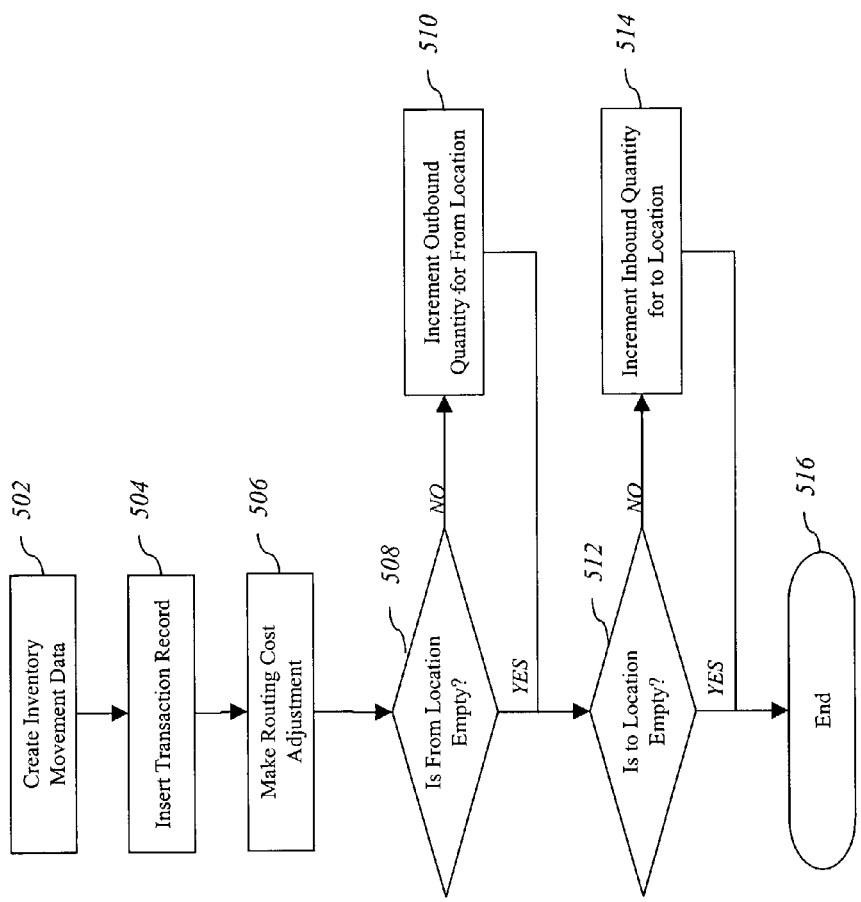
FIG. 5 is a flow chart illustrating a method for performing an inventory movement in an embodiment of this invention.

As illustrated in FIG. 5, after an inventory movement has been determined to be a valid movement in the system, the inventory management component begins recording the movement and making changes to the inventory quantities in the system 502.

The first transaction that is recorded for an inventory movement is the Inventory Transaction record that identifies the from and to locations along with a quantity and transaction type code identifying the reason the transaction occurred 504. In the case where a movement is tracked along a routing for the work order, cost accounting transaction adjustments are recorded as well 506. These adjustments are the values sent back to the cost system to determine the value of inventory after stages of production.

The following table lists a transaction record that is generated during a movement of inventory from In Transit to Receiving in an embodiment of this invention.

Transactions can also include a container that was scanned in the inventory movement. In the case of the plant receiving moon rocks, the plant would scan each moon rock and an inventory transaction is made at that time with the quantity of the container being the quantity of the transaction record. Movements that occur due to a scan of a container include the container in the transaction record while all other transactions do not.

Looking at the tables above, in the Location table are two locations. Location 1 is an In Transit location with a status of In Transit. The second location is a Received Location with a status of Receiving. The transaction that is generated identifies a WorkOrderSKU in the system. A WorkOrderSKU is the combination of a Work Order and a single SKU that is contained in that work order. Since Work Orders can have multiple SKUs, a key that identifies a combination of the two items is necessary to track inventory accurately. The transaction does not provide SKU in this case since the SKU of the inventory being acted upon can be obtained through the work order. The SKU column here is used when inventory movements occur on non-lot or non-work order based inventory such as inventory that is, for example, Odds Consolidation and Off Qualities production. The from location in this case is the identifier for the In Transit location and the to location is the identifier for the Receiving location. A quantity is specified that identifies how much inventory for the specified work order and SKU is being moved, and finally, the type of transaction is specified in the Transaction Type record. In this case, the movement is occurring because of a receipt of inventory, so the transaction type reflects this particular action in the system.

In the exemplary embodiment, once a transaction has been recorded, the system also makes adjustments to the inventory for each location to reflect the movement of inventory in the plant. For each combination of Location, Work Order, and SKU in the system, the inventory management component maintains two separate values or buckets. One value, the Inbound Quantity, indicates the amount of inventory for the items that have come into the location for the work order and SKU, and another value, the Outbound Quantity, stores the amount of inventory that has left the location. These values provide a picture of what came in and went out of a particular location and also provide a means to determine current inventory by using the following equation:

$$\text{Inbound Quantity} - \text{Outbound Quantity} = \text{Current Quantity in Location}$$

Inventory Transactions Table

| WorkOrderSKU | SKU | FromLocation | ToLocation | Quantity | TransactionType |
|---|---|---|---|---|---|
| 1 | 123 | 1 | 2 | 100 | RECV |

Location Table

| Location ID | Location Name | Status |
|---|---|---|
| 1 | In Transit Location | In Transit |
| 2 | Received Location | Receiving |

Before performing the transaction above that moved inventory from In Transit to Receiving, the table storing inventory for the system is as follows:

|   | Location  | Work Order SKU | Inbound Quantity | Outbound Quantity |
|---|-----------|----------------|------------------|-------------------|
| 1 | In Transit| 123            | 100              | 0                 |

After the transaction above, the table is modified as follows:

|   | Location  | Work Order SKU | Inbound Quantity | Outbound Quantity |
|---|-----------|----------------|------------------|-------------------|
| 1 | In Transit| 123            | 100              | 100               |
| 2 | Receiving | 123            | 100              | 0                 |

The second table that represents the inventory after the above transaction and illustrates that inventory has been moved out of the In Transit location and into the Receiving location and the quantities in the system now reflect the actions performed on the inventory and the current status. Using the equation from above, the current inventory for the system would be 0 for the Work Order in the In Transit location and 100 in the Receiving location, which identifies the current state of inventory for the work order in the system.

Referring again to FIG. 5, the inventory management component of the embodiment first checks the from location to determine if it is empty 508. If not, the system increments the outbound quantity for the from location 510. Next the component checks the to location to determine if it is empty 512. If not, the inventory management component increments the inbound quantity for the to location. The process then ends 516.

Figure 6:
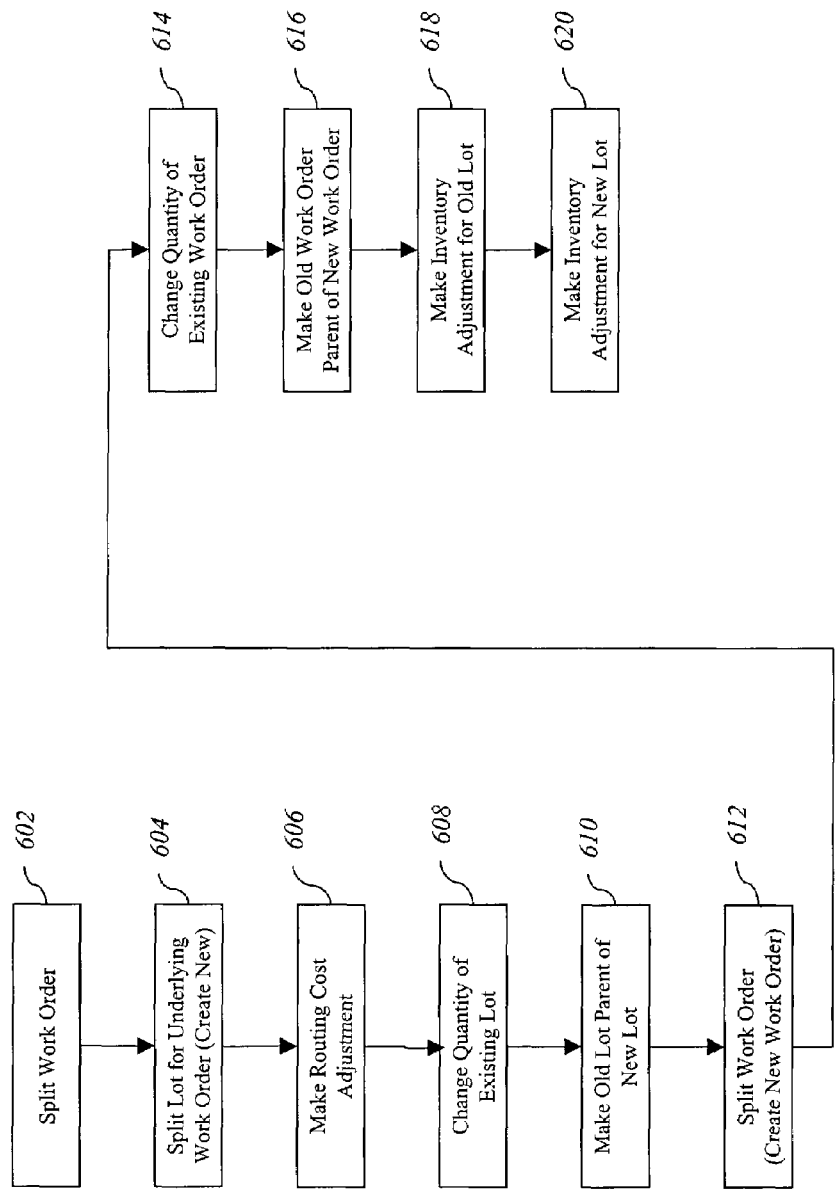
FIG. 6 is a flow chart illustrating a method for splitting a work order in an embodiment of this invention.

In an inventory management component of an embodiment of this invention, users can split a single work order into two separate work orders. FIG. 6 illustrates a process for splitting a work order in an embodiment of this invention. When splitting a work order, a corresponding split is performed on the Lot that the work order represents.

The process for splitting a work order includes the user selecting the current work order that needs to be split and specifying a quantity and new location for the portion of the work order that is split off 602. The existing work order remains where it is currently and the new work order is placed into the new location specified by the user. The movement of the split off work order will follow all existing rules for inventory movement and must adhere to the rules for a valid movement.

When splitting a work order, the Lot that the work order represents is split into two separate lots 604. The new Lot number adds the next alphabetic character to the Lot number up to the character 'Z'. For example, when splitting a work order whose underlying Lot is Lot 123456, the new Lot number is Lot 123456A. The new Work Order number follows the work order numbering algorithm specified above. Both the Lot and the Work Order records both have a quantity and an original quantity. If necessary the component makes a routing cost adjustment 606. When splitting a work order, the original quantity of the Lot and the work order remains the same, but the quantity attribute is modified to indicate the actual quantity currently in the Lot and work order 608.

In the embodiment shown, the component relates the lots by making the old lot the parent of the new lot 610. The component splits the work order, creating a new work order 612 and changes the quantity of the existing work order 614. The system then relates the work orders together by making the old work order the parent of the new work order 68. The component then creates inventory adjustments to the old lot 618 and the new log 620.

When a split occurs, the system has to create inventory transactions to reflect the actions performed in a split. The system will create two inventory transactions to handle a split, one transaction to reduce the quantity of the original lot 608 and work order and one transaction to increment the quantity of the new lot and work order.

Assuming the work order is in a Receiving location, the following tables illustrate an example of data present in an embodiment of this invention:

| Lot Table | | | |
|---|---|---|---|
| Lot ID | Lot Number | Original Quantity | Quantity |
| 1 | 123456 | 100 | 100 |

| Work Orders Table | | | | |
|---|---|---|---|---|
| Work Order ID | Work Order | Lot ID | Original Quantity | Quantity |
| 1 | TP12345601 | 1 | 100 | 100 |

| Work Orders SKU Table | | | | | |
|---|---|---|---|---|---|
| WorkOrder SKU | Work Order | Color CD | StyleCD | SizeDESC | Qty |
| 123 | 1 | W | 5180 | L | 100 |

| Transactions Table | | | | | | |
|---|---|---|---|---|---|---|
| | Work-Order SKU | SKU | From Location | To Location | Quantity | Transaction Type |
| 1 | 123 | Null | 1 | 2 | 100 | RECV |

| Work Order SKU Locations Table | | | | |
|---|---|---|---|---|
|   | Location | Work Order SKU | Inbound Quantity | Outbound Quantity |
| 1 | In Transit | 123 | 100 | 100 |
| 2 | Receiving | 123 | 100 | 0 |

After splitting the work order TP12345601 into equal parts of 50 and 50, and placing the new work order in the same location as the current work order, we would have the following data in the system:

Lot Table

| Lot ID | Lot Number | Original Quantity | Quantity | Parent Lot |
|---|---|---|---|---|
| 1 | 123456 | 100 | 50 | Null |
| 2 | 123456A | 50 | 50 | 1 |

Work Orders Table

| Work Order ID | Work Order | Lot ID | Original Quantity | Quantity | Parent Work Order |
|---|---|---|---|---|---|
| 1 | TP12345601 | 1 | 100 | 50 | Null |
| 2 | U912345601 | 2 | 50 | 50 | 1 |

Work Orders SKU Table

| WorkOrder SKU | Work Order | Color CD | StyleCD | SizeDESC | Qty |
|---|---|---|---|---|---|
| 123 | 1 | W | 5180 | L | 50 |
| 456 | 2 | W | 5180 | L | 50 |

Transactions Table

| | WorkOrder SKU | From SKU Location | To Location | Quantity | Transaction Type | Related Transaction |
|---|---|---|---|---|---|---|
| 1 | 123 | Null INTRAN | RECV | 100 | RECV | Null |
| 2 | 123 | Null RECV | Null | 50 | SPLIT | 3 |
| 3 | 456 | Null Null | RECV | 50 | SPLIT | 2 |

Work Order SKU Locations Table

| | Location | Work Order SKU | Inbound Quantity | Outbound Quantity |
|---|---|---|---|---|
| 1 | In Transit | 123 | 100 | 100 |
| 2 | Receiving | 123 | 100 | 50 |
| 3 | Receiving | 456 | 50 | 0 |

Note that two transactions are generated for the split. One transaction moves inventory from the receiving location of one work order to a null location while the other transaction moves inventory from a null location to the receiving location for the new work order. An attribute on the transaction also lists the related transaction so that transactions can be identified as being performed for the same action, in this case a split of the work order.

The underlying Lot for work order 1 was also split and given a new work order and the new work order was then applied to use the new Lot that was created. A new attribute for the Lot and Work order records was also used. In each case, the Lot and Work orders may have parents that allow the system to identify Lots and work orders that were split off back to the original or parent Lot and Work order.

In one embodiment of this invention, In addition to splitting a work order, users can also suspend a work order by moving it into a suspended location. In suspending a work order, the user specifies additional information such as the reason codes for suspending the work order. The system may also support performing an implicit split of a Lot if a work order to be sent does not include the complete Lot.

When suspending a work order, the system first determines if the work order has the same quantity as the Lot that it represents. If the quantity of the work order and the Lot are the same, then the work order may be suspended without any further processing. If the quantities of the work order and Lot are different, then the system splits the underlying Lot into two lots and attaching the new Lot to the existing work order and then performing the suspend process.

The actual transactions for a suspend are similar to the transactions for a normal movement. The only difference between a normal inventory movement and a suspend movement is that the transaction type for the transaction indicates that the transaction occurred due to a suspend and not just a normal movement.

However, in addition to creating the standard transaction and lot tracking records, the system adds information to the reason codes table for the specified Work Order, SKU, and Location. The table contains the location of the work order and SKU and provides a reason code with a quantity and an expected due date for production to resume on the work order.

For example, if 50 dozens of work order 1 and SKU 5180WL are suspended for various reasons, the table contains data similar to the table below:

|   | Location | WorkOrder SKU | Reason Code | Quantity | Expected Due Date |
|---|---|---|---|---|---|
| 1 | SUSPENDED | 1-5180WL | Missing Sleeves | 30 | Jan. 1, 2002 |
| 2 | SUSPENDED | 1-5180WL | Missing pockets | 50 | Dec. 25, 2002 |

Notice that it is possible to have multiple reasons for the same quantity. This is due to the fact that a quantity might be suspended for multiple reasons. In the above table, the user specifies the quantity for each reason code and the due date is editable by the user, however, it is prepopluated with a date based on the number of weeks assigned to a particular reason code.

In an embodiment in the apparel industry, when inventory in the system does not reflect actual garment counts in the physical world, the users have to make adjustments to force the inventory system to reflect the actual physical world. In these cases, the user has to make adjustments to the system to either add or remove inventory from a specific location. Adjustments are also made during Work Order reconciliation to clear all inventory locations of any quantities that remain for the reconciled work order.

An adjustment transaction is similar to a standard inventory movement transaction, except that empty locations are created on either the from or to locations. In the case of a positive adjustment, where inventory is being added that was not existent in the system previously, the from location is empty while the to location is the location that is receiving the positive adjustments. The table below represents a positive adjustment due to the fact that its from location is null and the to location is populated with the location receiving an adjustment. Also, the transaction type for the transaction indicates that the transaction occurs because of an adjustment made by the system or by the user:

| | Transactions Table | | | | | |
|---|---|---|---|---|---|---|
| | WorkOrder SKU | SKU | From Location | To Location | Quantity | Transaction Type | Related Transaction |
| 1 | 123 | Null | Null | RECV | 10 | ADJ | Null |

In the case of a negative adjustment, the table reflects this by having the location that is having the negative adjustment in the from location and the to location being empty to reflect the fact that inventory is being moved out of the location to an empty location. The table below illustrates a negative adjustment transaction record:

| | Transactions Table | | | | | |
|---|---|---|---|---|---|---|
| | WorkOrder SKU | SKU | From Location | To Location | Quantity | Transaction Type | Related Transaction |
| 1 | 123 | Null | RECV | Null | 10 | ADJ | Null |

When adjustments are performed, routing cost adjustments are made as well. When changing a SKU for an existing work order, the system performs similar processes to both the suspend and the split. If a work order does not encompass its entire underlying Lot, the system splits the underlying Lot and attaches the new lot to the work order before changing the SKU. When changing the SKU, the existing SKU has to be zeroed out and then the new SKU incremented such that it would contain the inventory that the old SKU contained.

When changing the SKU for a work order, the following transactions are made to reduce the inventory for the previous SKU and then to create inventory for the new SKU.

Work Orders SKU Table

| WorkOrder SKU | Work Order | Color CD | StyleCD | SizeDESC | Qty |
|---|---|---|---|---|---|
| 123 | 1 | W | 5180 | L | 0 |
| 456 | 1 | W | 518Y | L | 100 |

Transactions Table

| | WorkOrder SKU | From SKU | From Location | To Location | Quantity | Transaction Type | Related Transaction |
|---|---|---|---|---|---|---|---|
| 1 | 123 | Null | RECV | Null | 100 | SKUCHG | 2 |
| 2 | 456 | Null | Null | RECV | 100 | SKUCHG | 1 |

Work Order SKU Locations Table

| | Location | Work Order SKU | Inbound Quantity | Outbound Quantity |
|---|---|---|---|---|
| 1 | In Transit | 123 | 100 | 100 |
| 2 | Receiving | 123 | 100 | 100 |
| 3 | Receiving | 456 | 100 | 0 |

In the Work Order SKUs table, the system creates an additional record with the new SKU having all of the quantity of the work order and sets the quantity for the old SKU to 0. The Transactions table then has two related transaction records, the first one moving inventory for the old SKU to an empty location and then the next transaction record moving the inventory from an empty location to the new SKU location. The Work Order SKU locations table then contains data reflecting the inventory in the system, however, using the algorithm from above to determine where inventory is currently present, only the Work Order SKU 456, which is the identifier for the work order and the new SKU, has inventory located in the Receiving location for the plant.

In the case of routing cost transactions, the system rolls back all cost transaction adjustments and re-applies the adjustments in the routing for the new SKU since the cost may be different for the new SKU.

In the one embodiment, Odds and Off quality inventory quantities are tracked only by SKU. Since inventory that is produced into these locations loses Lot integrity, the system maintains SKU only movements from these locations forward. When making an inventory transaction to move inventory from Odds consolidation to Shipping for example, the transaction has no LotSKU information, but instead has only the SKU of the inventory being moved.

The transaction record inserted into the Transactions table is as follows:

SKU Locations Table

| | Location | SKU | Inbound Quantity | Outbound Quantity |
|---|---|---|---|---|
| 1 | ODDS | 5180WL | 10 | 10 |
| 2 | SHIP | 5180WL | 10 | 0 |

In the above case, the Transaction table does not make reference to any Work Order for the transaction since the transaction is for SKU information. There is also an additional table, the SKU Locations Table that is used to store inventory quantities by SKU only. This table also includes all other transactions that the Work Order inventory table does since inventory is tracked in all other locations in the system at the work order and SKU level, and only id Odds and Off Quality is the inventory tracked by SKU only.

In an embodiment of this invention, the primary supplier may wish to provide a standard set of styles for use in connection with the goods produced. In one embodiment, the system provides the user with the ability to select a style for creating case labels and provides a query capability to ensure that a manufacturing facility is using current and correct styles.

After signing on to the system, the user chooses a menu option to create labels. Since the labels are not created without selecting a style, the user is sent to a page that allows

Transactions Table

| | WorkOrder SKU | SKU | From Location | To Location | Quantity | Transaction Type | Related Transaction |
|---|---|---|---|---|---|---|---|
| 1 | Null | 5180WL | ODDS | SHIP | 10 | SHIPPING | Null | them to enter or query for a style. The user enters a style, or uses the fields provided to set query parameters. These fields are lists of the possible valid choices for the values, greatly reducing errors caused by users entry. The user clicks a button to submit the style or Query. The user is presented with information about one or more styles that match their query. The user clicks the link associated with the desired style and the system provides the label creation page.

When used in selecting a style for label creation, the user queries on any number of attributes, so the system allows the user to specify their query parameters, as well as the value to query on. When the query runs, the system restricts the results by all the specified parameters using AND logic. The resulting list of matches are presented to the user with enough detailed information about the style for the user to make an informed decision concerning which style to actually use. The user selects the style and continues the process of creating the case labels.

In one embodiment of this invention, a user views a report in order to review styles for compliance. The user selects a reports menu from the main navigation menu and selects a menu option, for example, the Style Master Report menu option. The system retrieves the data and generates the report. The system then presents the report to the user. The report may be manufacturing facility-specific and may include a summary of all the styles used within their plant. The report may also allow the user to view detail for a specific style or submit a query that returns a restrained list of styles or a single style that matches the criteria that the user entered. The system displays the query's results in a report, providing the ability to print the results are offered.

Embodiments of this invention provide numerous additional capabilities, including the capability of processing first-quality styles and processing off-quality styles. Also, embodiments provide interfaces to legacy systems, which provide the capability of downloading sizes, downloading carrier codes, and downloading destinations.

Embodiments of this invention may also provide receiving functionality including routing validation. In such a function, if the manufacturing facility is allowed to follow the routing, then the routing validation is executed. The RoutID, SKU info, and PlantCD are verified in the corresponding tables. If they are not valid, then the Receiving process is discontinued. Also, no transactions should exist pertaining to the routing or sequence for the receiving work order.

The receiving functionality also validates a work order. The status of the receiving work order must be 'In Transit' or 'On Site'. The Advance Ship Notice mentioned in the work order must exist in the system. The containers that are associated with the receiving work order are scanned and the status is marked to 'Onsite'. While scanning, the destination inventory locations are also mentioned. If Route info is not found in the work order, or the Route info is incorrect, the user can assign a route to the work order. Valid rout info is selected from the corresponding routing tables and the user selects the needed route.

If the plant receives containers from the textile plant, then any status are considered as valid status that can be marked on the received containers. From other plants (except from the textile plant): If the plant receives containers from other plants (except from the textile plant), then only the following status are considered as valid status that can be marked on the received containers.

The containers are marked 'On Site' while scanning, 'Received' while marking the corresponding work order, 'Shipped' while shipping the received containers to another plant (in this case, the containers are associated to a newly created manifest and work order. The associated work orders and manifests are marked are active.), and 'Received' when complete.

When the containers are scanned, the status of the containers is marked to 'OnSite'. When all the containers are marked to 'OnSite', then the corresponding WorkOrder is marked to 'Received' and Inventory movement process are executed. If there exists any containers with the status of 'InTransit', then the Mark process must be executed user interaction.

An embodiment of this invention may also include a shipping component. In a shipping component, the system first creates a Bill of Lading (BOL). For each new BOL, a new unique BOL number is generated by the system. BOL details like container number, seal number, etc, are entered into the system. Only one BOL is created for every shipped container/trailer. A BOL can have one or more manifest attached to it. The seal number is mandatory except, when mode of transport is air. Only a manifest with "OPEN" status can be attached to BOL. The newly created BOL has an "OPEN" status. The BOL cannot be OPENED or CLOSED once TRANSMITTED.

The shipping component next creates a manifest for the shipment. For every new manifest, a new unique manifest number is generated in the system. Manifests are attached to an existing BOL with an "OPEN" status. Manifest details like final destination, type of shipment are entered into the system. In an embodiment of this invention directed to apparel manufacturing, the manifest types are finished goods, cut parts, and partially finished goods.

More than one manifest can be attached to an existing BOL. At least one manifest attached to a BOL, should contain the same destination as BOL. The newly created manifest has an "OPEN" status. The MANIFEST cannot be OPENED OR CLOSED once TRANSMITTED. Once TRANSMITTED the newly created manifest is used to create ASN for the receiving plant.

Next the user selects a manifest to add cases to, and then scans any valid cases into the system onto that manifest with the same shipment type. For example, if a manifest has a shipment type of "finished goods", no "cut parts" or "partially finished goods" is allowed on the manifest. Inventory movement transactions are created for the goods from the location to the "shipping trailer" location with a "MANIFESTED" status. If steps are skipped when scanning case labels, for example, placed on a manifest before being placed in finished goods, system will create transactions to move the goods to all locations skipped. The transactions will also created the necessary inventory movements to be sent to legacy systems. A case may be rejected due to the following reasons if the case created locally in the plant: the case does not exist in the system; the case is already attached to another manifest; the case lot is already reconciled; or the case style does not belong to any valid distribution center to which that plant can ship goods. If the containers are created by another plant (except the textile plant), then only containers that have the status 'RECEIVED' can be scanned. This is applicable to all type of containers.

The user of an embodiment of this invention may also scan pallet labels on shipping pallets. The user first selects a manifest, scans the pallet label, and scans the valid cases. The system associates all of the cases to the pallet and created inventory movement transactions to move the cased goods on the pallet from the "Finished goods" location to the "shipping trailer" location with a "MANIFESTED" status.

In another embodiment, the user scans individual cut parts, partially finished goods, or samples (shipping miscellaneous garments). Miscellaneous garments may be shipped between manufacturing facilities in sealed moonrocks or cases. When scanning miscellaneous garments, the user selects a manifest of type "cut parts" or "partially finished goods" and scans the miscellaneous garment cases label. The system creates inventory movement transactions to move the miscellaneous garment from the location to the "shipping trailer" location with a "MANIFESTED" status. A user may also reprocess scanned items and add scanned case labels to a manifest. The scanned case labels are added to the manifest, once they are validated. The manifest must be in the OPEN status and the case label must have a non-manifested status.

In an embodiment of this invention, the user also transmits Bills of Lading (BOL). In one embodiment, only a BOL with a "CLOSED" status can be transmitted. The quantity in the BOL must match the total count of containers that are attached to the corresponding manifest. The destinations of any one of the manifests attached to the BOL must match the destination of the BOL. If the "finished goods" location is selected for cycle count, then the BOL should not be allowed to transmit.

The user then transmits the pickup notification. In order to transmit the notification, a user modifies the status of BOL to "pickup complete". This change produces a transaction to send to a legacy system and manifest information for the truck. It may also mark the manifests, BOL and the containers that are attached to the manifest to a status of "shipped". This function also creates RECEIVE transactions for the receiving plant.

The forgoing description of the preferred embodiments of the invention has been presented for the purpose of illustration and description and is not intended to be exhaustive or to limit the invention to the precise forms disclosed. Numerous modifications and adaptations thereof are apparent to those skilled in the art without departing from the spirit and scope of this invention.

What is claimed:

1. An integrated manufacturing system comprising:
    a web application server in communication with a computer network;
    a manufacturing application installed on the web application server, wherein the manufacturing application is configured to:
        receive manufacturing-related data from a plurality of supplier facilities, each having at least one client processor, wherein the manufacturing-related data comprises at least one of inventory tracking data, personnel tracking data, production tracking data, production scheduling data, supplies tracking data, or attribution tracking data,
        integrate the manufacturing-related data from the plurality of supplier facilities,
        determine an inventory status based at least in part on the manufacturing-related data,
        determine whether the inventory status is valid,
        receive an inventory transaction comprising an inventory routing,
        determine whether the inventory routing is valid based at least in part on the manufacturing-related data; and
    a data store in communication with the web application server, the data store configured to store the integrated manufacturing-related data.

2. The integrated manufacturing system of claim 1, wherein the manufacturing application comprises an apparel manufacturing application.

3. The integrated manufacturing system of claim 1, wherein the manufacturing application comprises a module.

4. The integrated manufacturing system of claim 3, wherein the module comprises a module selected from the group consisting of:
    an order receiving module;
    an inventory tracking module;
    a product shipping module;
    a quality audit tracking module;
    a personnel tracking module;
    a production tracking module;
    a payroll interface module;
    an attribution tracking module;
    a supplies tracking module;
    an in-plant production scheduling module; and
    a multi-lingual module.

5. The integrated manufacturing system of claim 1, wherein the computer network comprises at least one of a public computer network, a private computer network, and a governmental computer network.

6. The integrated manufacturing system of claim 1, wherein a first one of the at least one client processors comprises:
    a data collection sewer; and
    a data collection device in communication with the data collection server.

7. The integrated manufacturing system of claim 6, wherein the data collection device comprises a stationary bar code scanner.

8. The integrated manufacturing system of claim 6, wherein the data collection device comprises:
    a wireless network base station; and
    a portable bar code scanner in communication with the wireless network base station.

9. The integrated manufacturing system of claim 1, wherein the computer network comprises a computer network selected from the group consisting of a dial-up network, a wide area network, and the Internet.

10. The integrated manufacturing system of claim 1, wherein at least one of the plurality of supplier facilities comprises an independent supplier facility.

11. The integrated manufacturing system of claim 1, wherein at least one of the plurality of supplier facilities comprises a self-owned supplier facility.

12. The integrated manufacturing system of claim 1, wherein a first one of the at least one client processors comprises a client personal computer (PC) comprising a web browser application.

13. The integrated manufacturing system of claim 1, wherein the inventory status includes inventory data identifying a current location and a makeup of an inventory.

14. The integrated manufacturing system of claim 1, wherein the inventory status comprises one of: in transit, on site, received, suspended, issued, issued to sewing, issued to embroidery, issued to screen printing, issued to garment washing, issued to value add, sewn, embroidered, screen printed, garment washed, value added, produced, produced and packed, manifested, shipped, or disposed.

15. The integrated manufacturing system of claim 1, wherein the manufacturing application is further configured to generate a report.

16. The integrated manufacturing system of claim 15, wherein a report comprises one of a Shipping Manifest Details Report, a Shipping Manifest Summary report, a Bill of Lading report, a Style Master report, or a Location report.

17. The integrated manufacturing system of claim 1, wherein the manufacturing application is further configured to:

record the inventory transaction, and
update the manufacturing-related data based at least in part on the inventory transaction.

* * * * *

UNITED STATES PATENT AND TRADEMARK OFFICE
CERTIFICATE OF CORRECTION

PATENT NO. : 7,356,558 B2  Page 1 of 1
APPLICATION NO. : 10/224877
DATED : April 8, 2008
INVENTOR(S) : Anthony D. Luce and Randy Wilson It is certified that error appears in the above-identified patent and that said Letters Patent is hereby corrected as shown below:

Under "DETAILED DESCRIPTION OF THE INVENTION"

Column 4, Line 57, the phrase "The embodiment shown in Figure also includes" should read --The embodiment shown in Figure 1 also includes--

Column 12, Line 14, the phrase "being move from as well" should read --being moved from as well--

Under "CLAIMS"
Column 26, Line 27, the phrase "a data collection sewer; and" should read --a data collection server; and--

Signed and Sealed this

Twenty-ninth Day of July, 2008

JON W. DUDAS
*Director of the United States Patent and Trademark Office*